Feb. 27, 1962   N. F. CERULLI   3,023,338
ELECTROLUMINESCENT LAMP AND METHOD
Filed Aug. 12, 1959

INVENTOR
NICHOLAS F. CERULLI.

BY  *W. D. Palmer*
ATTORNEY

United States Patent Office 3,023,338
Patented Feb. 27, 1962

3,023,338
ELECTROLUMINESCENT LAMP AND METHOD
Nicholas F. Cerulli, Shingle Springs, Calif., assignor to Westinghouse Electric Corporation, East Pittsburgh, Pa., a corporation of Pennsylvania
Filed Aug. 12, 1959, Ser. No. 833,184
6 Claims. (Cl. 313—108)

This invention relates to glass- or ceramic-type electroluminescent lamps and, more particularly, to a method for making a ceramic-type electroluminescent lamp and the product resulting therefrom.

The most usual electroluminescent phosphors are copper-activated zinc sulfide types. The copper activator can be supplemented by other activators such as manganese if desired and a part of the zinc sulfide can be replaced by cadmium sulfide or even mercuric sulfide, as disclosed in copending application Serial No. 807,730, filed April 20, 1959, and owned by the present assignee. A comprehensive listing of electroluminescent phosphors can be found in Destriau and Ivey article titled, "Electroluminescence and Related Topics," appearing in the "Proceedings of the I.R.E.," volume 43, No. 12, pages 1911–1940 (December 1955).

In making copper-activated zinc sulfide-type electroluminescent phosphors, it is necessary to incorporate into the phosphor raw mix a large excess of copper over that which is normally required to produce a photoluminescent copper-activated zinc sulfide phosphor which is adapted to be excited by ultra-violet radiations, X-rays or cathode rays for example, but not by an electric field. Apparently a part of the copper which is used in making electroluminescent phosphors serves to form segregations of cuprous sulfide on or within the phosphor particles. Such cuprous sulfide segregations apparently serve to set up relatively-intense localized electric fields which excite the phosphor to visible luminescence. Whatever the explanation, in order to incorporate a desired amount of copper into the electroluminescent phosphor, it has been found necessary in practice to add a considerable excess of copper over that which is ultimately used. After formation of the phosphor by firing, some copper is removed by dissolution in a material which is a solvent for cuprous sulfide but which is not a solvent for zinc sulfide, such as a solution of sodium cyanide.

When the foregoing copper-activated zinc sulfide phosphors are embedded in plastic dielectric material, the initial brightness is good. When such phosphors are embedded in glass dielectric, however, the initial brightness is normally decreased, apparently because of a tendency for some limited reaction between the phosphor and the glass when the phosphor and glass are fired to form a continuous phosphor-embedded glass layer. Ceramic-type electroluminescent lamps have some advantages over those electroluminescent lamps wherein the phosphor is embedded in plastic in that the phosphor is less susceptible to damage by deleterious atmospheres and the resulting lamps are less susceptible to damage by temperature extremes and atmospheric conditions which might affect the plastic dielectric. In addition, a glass dielectric material inherently has a greater chemical and physical stability than a plastic dielectric. As noted hereinbefore, however, electroluminescent lamps of the ceramic type have displayed a relatively-low initial brightness, which has limited their application.

It is the general object of this invention to avoid and overcome the foregoing and other difficulties of and objections to prior-art practices by the provision of a method for making a ceramic-type electroluminescent lamp wherein the initial brightness is improved.

It is another object to provide a method for making a ceramic-type electroluminescent lamp which has a very uniform light output.

It is a further object to provide a method for making a ceramic-type electroluminescent lamp which can be fabricated of phosphor material which initially is photoluminescent but not electroluminescent and which phosphor is rendered electroluminescent during the fabrication of the ceramic-type lamp.

It is an additional object to provide an improved ceramic-type electroluminescent lamp which has been fabricated by an improved method.

The aforesaid objects of the invention, and other objects which will become apparent as the description proceeds, are achieved by providing an improved method for making a ceramic-type electroluminescent lamp as well as the product resulting therefrom wherein finely-divided phosphor including zinc sulfide as matrix and copper as activator and finely-divided glass frit are mixed together with a limited amount of additional copper compound. This mix is then fired to form a layer of phosphor embedded in glass suitable for use as a component part of an electroluminescent lamp. The glass is selected so that when fired at a temperature considerably lower than the temperature required to crystallize the matrix for copper-activated zinc sulfide phosphor, it will form a continuous, light-transmitting layer. When the phosphor, copper compound and glass mix is fired to form a continuous phosphor-embedded glass layer, the additional copper in the mix apparently reacts with the zinc sulfide phosphor. With such a method of preparation, the phosphor can be made to electroluminesce very evenly and brightly. In addition, it is not necessary to utilize electroluminescent zinc sulfide phosphor in the unfired phosphor-glass mix and any copper-activated zinc sulfide phosphor can be used in preparing the lamp, whether the phosphor is electroluminescent or merely photoluminescent.

For a better understanding of the invention, reference should be had to the accompanying drawings wherein.

Figure 1:
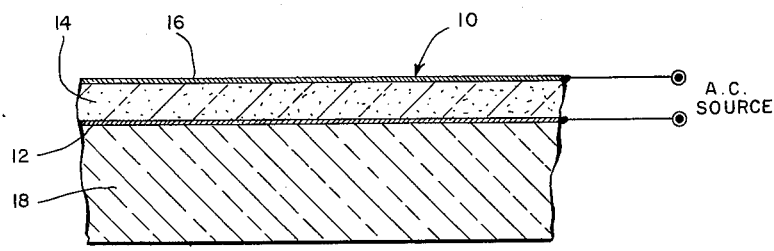
FIG. 1 is a fragmentary sectional elevation of an electroluminescent lamp wherein the phosphor particles are embedded in glass material with the phosphor-glass layer included between two spaced electrode layers.

With specific reference to the form of the invention shown in the drawings, the numeral 10 in FIG. 1, illustrates generally an electroluminescent lamp construction comprising a first light-transmitting electrode 12, a phosphor-glass dielectric layer 14 thereover and a second electrode 16 over the phosphor-dielectric layer 14. The electrodes 12 and 16 are adapted to have an alternating potential applied thereacross. As a specific example, the electrode 12 is formed of a light-transmitting tin oxide layer on a glass foundation 18. The second electrode 16 is formed of vacuum-metallized aluminum or, alternatively, two spaced light-transmitting electrodes formed of tin oxide can be used and the phosphor-dielectric layer included therebetween. As an alternative embodiment, an additional layer of dielectric material can be included between the spaced electrodes such as disclosed in British Patent No. 765,076, published January 2, 1957. The phosphor-dielectric layer 14 can also be formed directly on a metallic substrate, which can serve as one electrode of the lamp. In such an embodiment the light-transmitting electrode can be formed directly on the phosphor-dielectric layer by conventional techniques.

Figure 2:
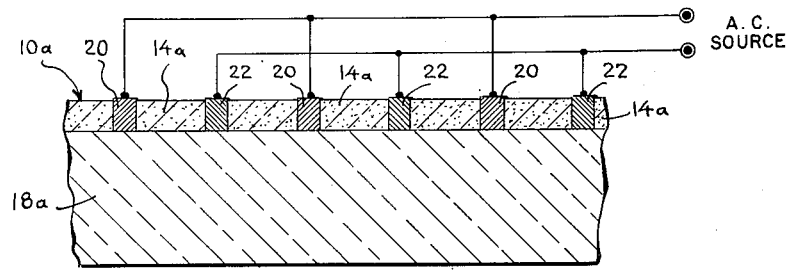
FIG. 2 is an alternative cell construction wherein the spaced lamp electrodes are formed as an interlacing, raster-type grid with electroluminescent phosphor embedded in glass and positioned between the individual spaced conductors which form the lamp electrodes.

In FIG. 2 is shown an alternative cell construction 10a wherein the cell electrodes 20 and 22 are formed as intermeshing spaced wires or strips on a non-conducting foundation 18a, such as disclosed in U.S. Patent No. 2,684,450, dated July 20, 1954. The phosphor-dielectric layer 14a, which is generally as described hereinafter, is included between the spaced electrode strips. In either of the foregoing embodiments, the relative proportions of phosphor to glass are not critical and as an example, one part by weight of phosphor is used per three parts by weight of glass. The thickness of the phosphor-dielectric layers 14 or 14a is not critical and as an example is two mils.

Before incorporating the phosphor material into the embedding glass in accordance with the present invention, phosphor which includes zinc sulfide as matrix and copper as activator is first prepared in accordance with conventional practices. As is known in the phosphor art, the host crystal or the primary material which comprises the phosphor is referred to as the matrix. The phosphor also contains a relatively-small proportion of luminescence-promoting substance which is called the activator. The matrix and activator are normally separated by a colon, which indicates variable and generally non-stoichiometric proportions of the matrix and activator. In the present case, the phosphor matrix can be formed of zinc sulfide, zinc-cadmium sulfide or zinc-cadmium-mercuric sulfide. The activator constituent for the phosphor can be copper, copper and manganese or copper and lead for example and other additional activators which supplement the copper activator can also be used. Such electroluminescent phosphors, with the exception of the phosphor which includes mercuric sulfide as a part of the matrix, are well known. The phosphor need not be electroluminescent as prepared initially and a photoluminescent, copper-activated zinc-sulfide phosphor can be used if desired in forming the phosphor-glass layer, which photoluminescent phosphor is rendered electroluminescent when the phosphor is embedded in the glass dielectric layer. Photoluminescent copper-activated zinc-sulfide phosphors are very well known. As a specific example for preparing a copper-activated zinc-sulfide electroluminescent phosphor, reference is made to U.S. Patent No. 2,874,128, dated February 17, 1959. The usual temperatures required to form copper-activated, zinc-sulfide electroluminescent phosphor are in the order of from 800° C. to 1100° C. and preferably from 850° C. to 1000° C. Such temperatures are required apparently to form the matrix crystal. In accordance with the present method, such temperatures are not required to enable a photoluminescent zinc-sulfide phosphor to be rendered electroluminescent.

The glass which is used in making the present lamps is specially chosen so that it will form a continuous light-transmitting layer from a finely-divided mix or frit when fired at a temperature considerably lower than the temperature required to crystallize the matrix for copper-activated zinc sulfide electroluminescent phosphor. In addition the glass used should display substantially no reaction with zinc sulfide when fired in the presence of such material to form a continuous light-transmitting layer from a finely-divided mix or frit. As an example, the temperature used to form the phosphor-glass layer should not exceed about 700° C. and desirably should not exceed about 625° C. As a practical matter, it is difficult to obtain a glass which will form a light-transmitting continuous layer from a finely-divided mix or frit when fired at a temperature appreciably less than about 500° C. Following are five specific examples of suitable glass frit materials which can be used.

| Constituent | Example and Amount (expressed as percent by weight) | | | | |
|---|---|---|---|---|---|
| | 1 | 2 | 3 | 4 | 5 |
| ZnO | 20.0 | 23.5 | 25.0 | 20.0 | 30.8 |
| BaO | 25.0 | 29.5 | 35.0 | 40.0 | 6.2 |
| B₂O₃ | 45.0 | 35.3 | 30.0 | 25.0 | 27.5 |
| K₂O | 6.7 | 7.8 | 6.7 | 10.0 | 10.3 |
| Na₂O | 3.3 | 3.9 | 3.3 | 5.0 | 5.2 |
| Li₂O | | | | | 1.3 |
| Al₂O₃ | | | | | 2.6 |
| TiO₂ | | | | | 3.6 |
| SiO₂ | | | | | 12.5 |

In initially preparing the foregoing glass frit examples, the usual glass-forming compounds can be used in place of the indicated oxides, maintaining the equivalent oxide content as indicated. Such glass-forming compounds are soda ash, calcium, barium, potassium and lithium carbonates and boric acid or borax for example. Reference is made to copending applications S.N. 816,404 filed May 28, 1959 and S.N. 816,405 filed May 28, 1959 by N. F. Cerulli, the inventor herein, and owned by the present assignee, for further details for initially preparing the foregoing glass compositions.

Any of the foregoing glass frits are first finely-divided. The state of division is not critical, but as an example, a No. 325 mesh screen is used to separate the desired fine material. To the selected glass mix or frit is added a selected amount of finely-divided copper-activated zinc sulfide photoluminescent phosphor or electroluminescent phosphor. As noted, the ratio by weight of phosphor to dielectric is in no way critical and as an example, one part by weight of finely-divided phosphor is used per three parts by weight of finely-divided glass. To the finely-divided phosphor and glass is also added a limited amount of copper in compound form. The type of copper compound addition is not critical and as an example, the copper can be added as finely-divided carbonate, oxide or nitrate. The amount of copper compound which is added is not particularly critical, but preferably the copper compound is added in such amount that the copper content thereof constitutes from 0.001% to 0.01% by weight of the total mix of phosphor and glass frit. The foregoing materials are thoroughly mixed and placed in thin-layer form on the substrate which is to form one electrode, such as a metallic plate or a tin-oxide-coated glass foundation. The mixed layer of phosphor, glass and copper compound is then fired to cause the glass frit to form a continuous light-transmitting layer which embeds the phosphor. As an example, any of the foregoing glass examples can be fired at a temperature of approximately 600° C. for about five minutes to form the layers 14 or 14a. This firing temperature can be varied considerably such as from 500° C. to 625° C. The firing time is also subject to considerable variation. After firing and cooling, the second electrode 16 as shown in FIG. 1 is vacuum metallized in place to complete the fabrication of the electroluminescent lamp. If the phosphor-dielectric layer is formed on a metallic substrate, a light-transmitting tin oxide electrode layer is formed on the phosphor-dielectric layer.

During the foregoing firing, the copper compound which is included in the phosphor-glass mix apparently reacts wtih sulphur in the phosphor to form localized segregations of cuprous sulfide on and within the phosphor. Whatever the explanation, the foregoing firing causes the phosphor to be very evenly and brightly electroluminescent in case the phosphor used in the unfired mix was already electroluminescent. In the case the phosphor in the unfired mix was photoluminescent but not electroluminescent, the foregoing firing causes the phosphor to become very evenly and brightly electroluminescent. In controlled tests, lamps prepared in accordance with the present invention displayed a maximum brightness approximately twice that of control lamps which were otherwise similar, but which did not incorporate the copper compound in the glass-electroluminescent phosphor mix.

It will be recognized that the objects of the invention have been achieved by providing a method for making a ceramic-type electroluminescent lamp and the product resulting therefrom wherein the initial brightness of the lamp is improved and wherein the lamp has a very uniform light output. In addition, there has been provided a method for making a ceramic-type electroluminescent lamp and the lamp resulting therefrom wherein a photoluminescent but not electroluminescent phosphor material is used in fabricating the lamp.

While best embodiments of the invention have been illustrated and described in detail, it is to be particularly understood that the invention is not limited thereto or thereby.

I claim:

1. The method of making a layer comprising zinc sulfide electroluminescent phosphor embedded in light-transmitting glass material, which method comprises, preparing a mix comprising phosphor which includes zinc sulfide as matrix and copper as activator and finely-divided glass which when fired at a temperature considerably lower than the temperature required to crystallize the matrix for zinc sulfide electroluminescent phosphor will display substantially no reaction with zinc sulfide and will form a continuous light-transmitting layer, adding to said mix a predetermined limited amount of copper in compound form, and firing said mix and added copper compound for a predetermined temperature and time to form a continuous phosphor-embedded glass layer and to cause said phosphor to be evenly and brightly electroluminescent.

2. The method of making a layer comprising zinc sulfide electroluminescent phosphor embedded in light-transmitting glass material, which method comprises, preparing a mix comprising phosphor which includes zinc sulfide as matrix and copper as activator and finely-divided glass which when fired at a temperature considerably lower than the temperature required to crystallize the matrix for zinc sulfide electroluminescent phosphor will display substantially no reaction with zinc sulfide and will form a continuous light-transmitting layer, adding to said mix from 0.001% to 0.01% by weight of total mix of copper in compound form, and firing said mix and added copper compound for a predetermined temperature and time to form a continuous phosphor-embedded glass layer and to cause said phosphor to be evenly and brightly electroluminescent.

3. The method of making a layer comprising zinc sulfide electroluminescent phosphor embedded in light-transmitting glass material, which method comprises, preparing a mix comprising photoluminescent but not electroluminescent phosphor which includes zinc sulfide as matrix and copper as activator and finely-divided glass which when fired at a temperature considerably lower than the temperature required to crystallize the matrix for zinc sulfide electroluminescent phosphor will display substantially no reaction with zinc sulfide and will form a continuous light-transmitting layer, adding to said mix a predetermined limited amount of copper in compound form, and firing said mix and added copper compound for a predetermined temperature and time to form a continuous phosphor-embedded glass layer and to cause said phosphor to be evenly and brightly electroluminescent.

4. The method of making a layer comprising zinc sulfide electroluminescent phosphor embedded in light-transmitting glass material, which method comprises, preparing a mix comprising phosphor which includes zinc sulfide as matrix and copper as activator and finely-divided glass which when fired at a temperature considerably lower than the temperature required to crystallize the matrix for zinc sulfide electroluminescent phosphor will display substantially no reaction with zinc sulfide and will form a continuous light-transmitting layer, adding to said mix a predetermined limited amount of copper in compound form, and firing said mix and added copper compound at from 500° C. to 625° C. for a predetermined time to form a continuous phosphor-embedded glass layer and to cause said phosphor to be evenly and brightly electroluminescent.

5. An electroluminescent lamp comprising, spaced electrodes, finely-divided electroluminescent phosphor embedded in glass included between said spaced electrodes, said phosphor comprising zinc sulfide and including copper as activator, and said phosphor having been embedded in glass by the method which comprises: preparing a mix comprising phosphor which includes zinc sulfide as matrix and copper as activator and finely-divided glass which when fired at a temperature considerably lower than the temperature required to crystallize the matrix for zinc sulfide electroluminescent phosphor will display substantially no reaction with zinc sulfide and will form a continuous light-transmitting layer, adding to said mix a predetermined limited amount of copper in compound form, and firing said mix and added copper compound for a predetermined temperature and time to form a continuous phosphor-embedded glass layer and to cause said phosphor to be evenly and brightly electroluminescent.

6. The method of making a layer comprising zinc sulfide electroluminescent phosphor embedded in light-transmitting glass material, which method comprises, preparing a mix comprising phosphor which includes zinc sulfide as matrix and copper as activator and finely divided glass which when fired at a temperature of from 500° C. to 625° C. will display substantially no reaction with zinc sulfide and will form a continuous light-transmitting layer, adding to said mix from 0.001% to 0.01% by weight of the total mix of copper in compound form, and firing said mix and added copper compound at from 500° C. to 625° C. for a predetermined time to form a continuous phosphor-embedded glass layer and to cause said phosphor to be evenly and brightly electroluminescent.

References Cited in the file of this patent

UNITED STATES PATENTS

| | | |
|---|---|---|
| 2,689,190 | Hushley | Sept. 14, 1954 |
| 2,768,310 | Kazan et al. | Oct. 23, 1956 |
| 2,838,715 | Payne | June 10, 1958 |
| 2,878,394 | Koury | Mar. 17, 1959 |
| 2,900,545 | Rulon et al. | Aug. 18, 1959 |